Figure 1:
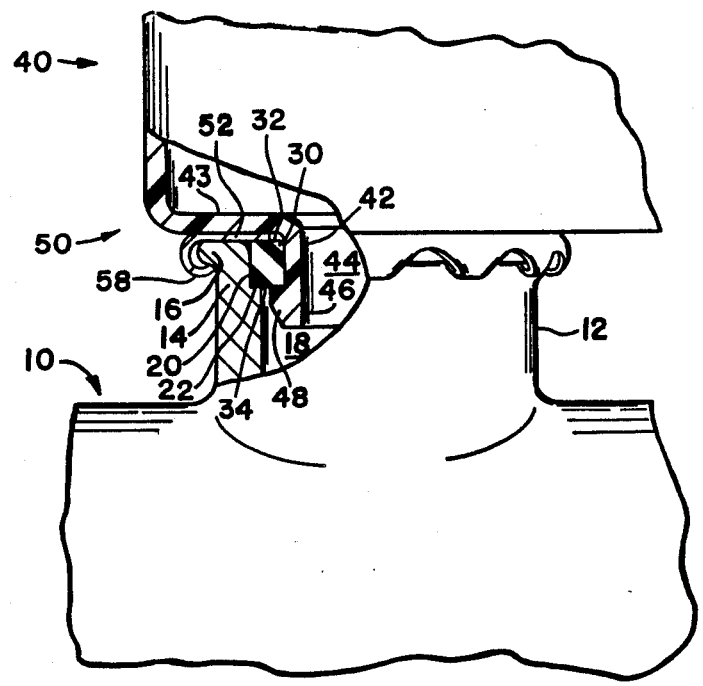

United States Patent [19]

Jordan

[11] Patent Number: 4,890,456

[45] Date of Patent: Jan. 2, 1990

[54] MASTER CYLINDER AND RESERVOIR CONNECTION

[75] Inventor: David D. Jordan, South Bend, Ind.

[73] Assignee: Allied-Signal Inc., Morristown, N.J.

[21] Appl. No.: 202,615

[22] Filed: Jun. 6, 1988

[51] Int. Cl.$^4$ ............................................. B60T 11/26
[52] U.S. Cl. ........................................ 60/585; 285/319
[58] Field of Search ................. 60/585, 586, 587–589, 60/592; 220/304, 308, 358, 378; 285/319, 921

[56] References Cited

U.S. PATENT DOCUMENTS

| | | | |
|---|---|---|---|
| 2,583,109 | 1/1952 | Luton | 285/319 X |
| 3,237,412 | 3/1966 | Ferrell | 60/586 |
| 3,603,621 | 9/1971 | Parsons | 285/319 |
| 3,933,378 | 1/1976 | Sandford et al. | 285/319 |
| 4,035,005 | 7/1977 | DeVincent et al. | 285/319 |
| 4,133,178 | 1/1979 | Brooks, Sr. | 60/578 |
| 4,208,881 | 6/1980 | Brademeyer et al. | 60/588 X |
| 4,385,495 | 5/1983 | Kubota | 60/535 |
| 4,437,310 | 3/1984 | Morita et al. | 60/562 |
| 4,441,319 | 4/1984 | Brown | 60/548 |
| 4,472,942 | 9/1984 | Nomura et al. | 60/589 X |
| 4,474,005 | 10/1984 | Steer | 60/562 |
| 4,503,677 | 3/1985 | Crumb et al. | 60/562 |
| 4,615,175 | 10/1986 | Ishiwata et al. | 60/592 X |
| 4,702,078 | 10/1987 | Briggs et al. | 60/585 |
| 4,781,400 | 11/1988 | Cunningham | 285/319 X |
| 4,783,101 | 11/1988 | Peterson et al. | 285/319 |
| 4,786,085 | 11/1988 | Sauer et al. | 285/319 X |

FOREIGN PATENT DOCUMENTS 2408493 6/1979 France.
54-156975 11/1979 Japan.

*Primary Examiner*—Edward K. Look
*Attorney, Agent, or Firm*—Larry J. Palguta; Ken C. Decker

[57] ABSTRACT

A connection for press fitting and securing together a reservoir (40) to a master cylinder housing (10) comprises a master cylinder housing extension (12) having an end (14) with an exterior abutment (16) and an enlarged interior diameter section (20) which provides a shoulder (22). An annular seal (30) is received within the enlarged interior diameter section (20) with a flat edge (34) of the seal (30) engaging the shoulder (22) and extending radially inwardly relative to the housing extension (12). A retainer member (50) is annular shaped and includes a horizontal portion (52) with a central opening (54), the horizontal portion (52) extending into a substantially orthogonally disposed side portion (56) that has a plurality of curved fingers (58). The retainer member (50) is snap fitted over end (14) of the housing extension (12) so that the fingers (58) resiliently engage the exterior abutment (16) and the horizontal portion (52) retains the seal (30) within the enlarged interior diameter section (20). A reservoir abutment (48) on a reservoir extension (42) engages the flat edge of the seal (30) so that the retainer member (50) retains the seal (30) and reservoir extension (42) within the housing extension (12).

4 Claims, 1 Drawing Sheet

U.S. Patent    Jan. 2, 1990    4,890,456

MASTER CYLINDER AND RESERVOIR CONNECTION

This invention relates generally to a connection for securing a reservoir to a master cylinder housing, and in particular to a connection which provides for a snap together connection of the reservoir and master cylinder housing.

Prior master cylinder constructions typically attach the reservoir to the master cylinder housing by means of a molded seal which is received within an undercut disposed in an extension of the master cylinder housing. The seal is attached by means of the undercut and then an extension of the reservoir inserted through the seal so that a lip of the extension engages the bottom of the seal and retains the reservoir in connection with the housing. The utilization of this type of connection requires that an undercut be machined into the extension of the master cylinder housing, this being an expensive and time consuming procedure. It is highly desirable to provide a connection for securing a reservoir to a master cylinder housing without requiring the machining of an undercut within the master cylinder housing. The present invention provides for the securement of the reservoir to the master cylinder without requiring any undercut. The undercut is eliminated and replaced by an enlarged interior diameter section which provides a shoulder for engagement by a seal which may be a lathe cut seal instead of a previously required molded seal. The present invention eliminates the more expensive machining and molding procedures in order to provide a simple press together or snap-on fitting of the reservoir to the master cylinder housing. The present invention comprises a fluid containing reservoir having a reservoir extension extending therefrom and an end of the extension having an abutment thereat, a master cylinder housing having a housing extension with an end of the housing extension having an abutment thereat and an enlarged interior diameter section providing a housing shoulder, a seal disposed within the enlarged interior diameter section and having a flat edge received by the housing shoulder, the abutment of the reservoir extension engaging the flat edge of the seal, and a retainer member disposed between said reservoir and end of the housing extension, the retainer member having a horizontal portion which extends between the reservoir and seal, the horizontal portion extending into a side portion disposed substantially orthogonally relative to the horizontal portion, and the side portion including a plurality of the fingers, the fingers engaging retainably the abutment of the housing extension, whereby the fingers engagement of the abutment of the housing extension secures the seal and reservoir to the housing extension.

Figure 2:
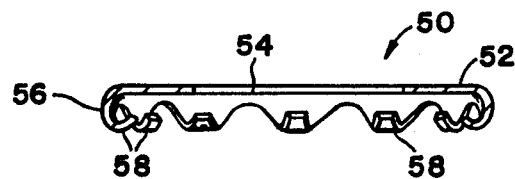

One way of carrying out the invention is described in detail below with reference to the drawings which illustrate an embodiment in which:

FIG. 1 illustrates an enlarged section view of the attachment of the reservoir to the master cylinder; and FIG. 2 is an isometric view of the retainer member of the present invention.

Referring to FIG. 1, the master cylinder housing is designated generally by reference numeral 10 and includes an annular housing extension 12 which comprises an end 14 having an exterior abutment 16. Extension 12 includes an enlarged interior diameter section 20 with a shoulder 22. Disposed in sealing engagement with diameter section 20 is an annular lathe cut rubber seal 30 which has a generally rectangular cross section with flat edges 32 and 34. Flat edge 34 is received by shoulder 22 an extends radially inwardly of interior opening 18. A master cylinder reservoir designated generally by reference numeral 40 includes an annular reservoir extension 42 which defines an opening 44 for brake fluid to flow into the master cylinder through housing extension 12. Extension 42 extends into end 46 which has an exterior abutment 48 that engages flat edge 34 of seal 30. Extension 42 engages resiliently and sealingly the seal 30 to effect a fluid seal between reservoir 40 and master cylinder housing 10. A retainer member designated generally by reference numeral 50 is annular shaped and includes a horizontal portion 52 having a central opening 54, the horizontal portion 52 extending into a substantially orthogonally disposed side portion 56 which terminates in a plurality of curved fingers 58. Retainer member 50 is disposed between a bottom portion 43 of reservoir 40 and the end 14 of housing 10. The horizontal portion 52 extends radially inwardly of the interior diameter section 20 and the curved fingers resiliently engage the exterior abutment 16. Retainer member 50 is resiliently fastened to master cylinder housing extension 12, the horizontal portion 52 of retainer 50 retaining the seal in engagement with enlarged interior diameter section 20 so that the seal retains the reservoir in engagement with the master cylinder housing by means of the reservoir exterior abutment 48 which engages flat edge 34 of seal 30. The clearance between opening 54 and extension 42 compensates for any difference in concentricity between the opening 18 and extension 42.

The connection between reservoir 40 and master cylinder housing 10 is effected by first placing seal 30 within opening 18 of housing extension 12 so that the seal is seated within enlarged interior diameter section 20. Next the retainer member is pressed down over end 14 of extension 12 so that the fingers resiliently engage exterior abutment 16, causing them to spread radially outwardly so that the ends of the fingers snap under abutment 16 whereby retainer member 50 is fixed securely to extension 12 and horizontal portion 52 of retainer member 50 retains seal 30 within enlarged interior diameter section 20. Finally, extension 42 of reservoir 40 is inserted into interior opening 18 of extension 12 whereby the abutment 48 resiliently engages seal 30 so that when the reservoir is fully inserted such that bottom 43 of reservoir 40 engages flat portion 52 of retainer member 50, the abutment 48 snaps into engagement with flat edge 34 of seal 30. Reservoir 40 is securely fastened by means of a press together or snap together fitting of the reservoir to the master cylinder housing via the retainer member 50 and seal 30, and a fluid tight seal is effected between the reservoir and master cylinder housing so that brake fluid will be provided for operation of the master cylinder.

The present invention provides substantial advantages over prior master cylinder constructions. First, the expensive and time consuming procedure of providing an undercut within the housing extension is eliminated. The enlarged interior diameter section may be provided by a simple machining operation or provided when the master cylinder is cast. The metal retainer is inexpensively manufactured and the seal may be a less expensive lathe cut seal instead of a more expensive molded seal. The members of the connection are assembled as described above wherein the reservoir is simply press fitted or snapped together with the housing via the connection so that the reservoir is securely and sealably attached quickly and simply to the master cylinder housing.

It is reasonably to be expected that those skilled in the art can make numerous revisions and additions to the invention and it is intended that such revisions and additions will be included in the scope of the following claims as equivalents of the invention.

I claim:

1. A connection between a fluid-containing reservoir and a master cylinder housing, comprising a reservoir extension extending from the reservoir and an end of the extension having an abutment thereat, the master cylinder housing having a housing extension with an end of the housing extension having an abutment thereat and an enlarged interior diameter section defining with a reduced interior diameter section a housing shoulder, a seal disposed within the enlarged and reduced interior diameter sections and having a rectangular cross section which includes a flat edge received by the housing shoulder, the flat edge extending radially inwardly beyond the shoulder, the abutment of the reservoir extension engaging the flat edge of the seal which extends radially inwardly beyond the shoulder, and a rectangular member disposed between said reservoir and end of the housing extension, the retained member having a horizontal portion which extends between the reservoir and seal, the horizontal portion extending into a side portion disposed substantially orthogonally relative to the horizontal portion, and the side portion including a plurality of fingers, the fingers engaging retainably the abutment of the housing extension, whereby the fingers engagement of the abutment of the housing extension secures the seal and reservoir to the housing extension.

2. The connection in accordance with claim 1, wherein the reservoir extension is annular shaped, the housing extension is annular shaped, and the connection is effected by inserting the reservoir extension through the seal until the abutment of the reservoir extension engages resiliently the flat edge of the seal.

3. The connection in accordance with claim 2, wherein the retainer member is generally annular shaped and includes therein a central opening, the central opening receiving therethrough the reservoir extension.

4. The connection in accordance with claim 3, wherein the fingers are resilient curved fingers and snap into engagement with the abutment of the housing extension.

* * * * *